US006116853A

United States Patent [19]

Steinborn

[11] Patent Number: 6,116,853

[45] Date of Patent: Sep. 12, 2000

[54] METHOD AND APPARATUS FOR CHECKING THE OPERATING RELIABILITY OF A TURBINE DURING LOAD SHEDDING

[75] Inventor: Richard Steinborn, Leverkusen, Germany

[73] Assignee: Siemens Aktiengesellschaft, Munich, Germany

[21] Appl. No.: 09/191,483

[22] Filed: Nov. 13, 1998

[51] Int. Cl.[7] .............................. F01B 25/00; G05B 11/00

[52] U.S. Cl. .............................. 415/118; 415/17; 290/52; 434/218; 434/224; 434/365

[58] Field of Search .............................. 415/118, 15, 16, 415/17, 30, 36; 290/52, 40 R, 42, 43, 53; 434/218, 219, 224, 365; 703/6, 13

[56] References Cited

U.S. PATENT DOCUMENTS

| | | | |
|---|---|---|---|
| 4,146,270 | 3/1979 | Nurnberger et al. | 290/40 R |
| 4,694,188 | 9/1987 | Diegel et al. | 290/40 R |
| 5,953,902 | 9/1999 | Jerye et al. | 60/39.281 |

FOREIGN PATENT DOCUMENTS

| | | |
|---|---|---|
| 1401456 | 10/1968 | Germany . |
| 2627591 | 12/1977 | Germany . |
| 19528601C2 | 7/1998 | Germany . |
| 2011126A | 7/1979 | United Kingdom . |

*Primary Examiner*—Edward K. Look
*Assistant Examiner*—Richard Woo
*Attorney, Agent, or Firm*—Herbert L. Lerner; Laurence A. Greenberg; Werner H. Stemer

[57] ABSTRACT

For checking the operating reliability of a turbine during load shedding, input values having simulated time profiles are fed to a regulating circuit regulating a turbine. The reaction of the regulating circuit to the input values simulating load shedding conditions is subsequently measured. Changes in the regulating circuit are then detected by comparison with an earlier measurement.

19 Claims, 1 Drawing Sheet

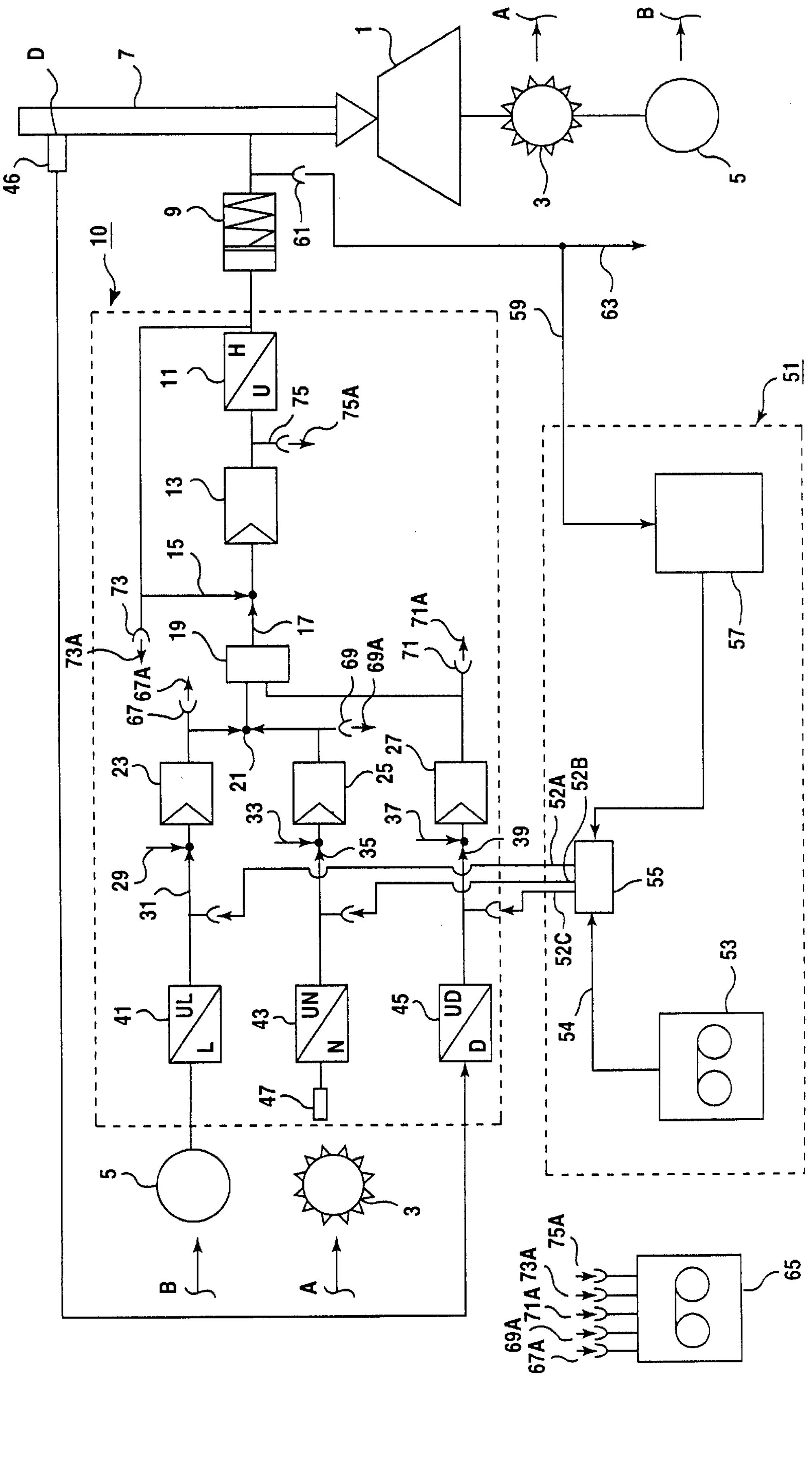
D
7
1
A
B
46
3
5
9
61
10
63
59
11
H
U
75
75A
51
13
15
73
17
19
73A
71A
71
69
69A
67
67A
23
21
25
27
57
52A
52B
33
37
29
35
39
31
55
52C
53
41
UL
L
43
UN
N
45
UD
D
54
47
5
3
B
A
75A
73A
71A
69A
67A
65

METHOD AND APPARATUS FOR CHECKING THE OPERATING RELIABILITY OF A TURBINE DURING LOAD SHEDDING

BACKGROUND OF THE INVENTION

Field Of The Invention

The invention relates to a method for checking the operating reliability of a turbine during load shedding with a regulating circuit for regulating the rotational speed of the turbine. The invention also relates to a corresponding apparatus.

A regulating device for turbines with rotational speed regulation and power regulation is disclosed in Published, Non-Prosecuted German Patent Application DE 26 27 591 A1. In order to prevent an emergency shutdown protection device from responding due to excessively high over-speeds in the event of sudden load cutoffs, it is specified therein that the speed regulator and power regulator are configured to be functionally independent of one another over the entire working range, the correcting variables of these two regulators being fed as input signals to a minimum element.

A power monitoring system for gas turbines is disclosed in British Patent Application GB 2,011,126 A. A regulating network regulates the rotational speed of the gas turbine. Detection devices, by which a load change is detected, are provided. The detection devices generate a signal which represents the load change and modifies the output signal from the regulating network in such a way that delays caused by the regulating circuit are eliminated or reduced.

Published, Non-Prosecuted German Patent Application DE 14 01 456 A is concerned with a device for regulating the rotational speed of turbines. A multi-loop regulating circuit is provided, which contains an electric rotational speed regulating part-circuit and an electrohydraulic regulating part-circuit which is subordinate to the latter and which determines the opening of the actuating members releasing the supply of energy. The properties of a hydraulic component which are disadvantageous for regulating dynamics, such as inertia or nonlinear amplification, are compensated by such a regulating circuit.

A regulating device for regulating the rotational speed of a turbine and a method for regulating the rotational speed of a turbine during load shedding is disclosed in German Patent DE 19 528 601 C2. A first regulating structure with a PI controller, to which a deviation signal can be supplied, is provided. The deviation signal is dependent specifically on the difference between the desired value and actual value of the rotational speed. The first regulating structure is connected to an actuator serving for regulating the rotational speed. The first regulating structure serves for regulating the rotational speed when the turbine is in the no-load and/or isolated operating mode. During load shedding, a closing signal is fed to the actuator. The proportionality constant of the PI controller is selected in such a way that, where a deviation signal of a predeterminable minimum size is present, the output signal from the PI controller assumes the value 0. Such a regulating device affords a uniform and simple possibility for regulating the rotational speed of the turbine, without the need for additional load jump equipment that is intended to prevent an emergency shutdown of the turbine in the event of load shedding.

SUMMARY OF THE INVENTION

It is accordingly an object of the invention to provide a method and apparatus for checking the operating reliability of a turbine during load shedding which overcomes the above-mentioned disadvantages of the prior art methods and devices of this general type.

With the foregoing and other objects in view there is provided, in accordance with the invention, a method for checking operating reliability of a turbine during load shedding, which includes: feeding an input value having a time profile simulating a turbine load shedding condition to a regulating circuit for regulating a rotational speed of a turbine for simulating the turbine load shedding condition in the regulating circuit; and measuring a reaction of the regulating circuit to the input value simulating the turbine load shedding condition.

The turbine serves for driving a load. For example, steam or gas turbines are used for driving a generator for the purpose of generating electric energy. The load prevailing on the turbine will be lower or higher, depending on the power taken from the generator. A sudden decrease in the load is referred to as load shedding. Such load shedding corresponds to the lapse of braking action on the turbine, so that the turbine is accelerated, that is to say its rotational speed is increased. The rotational speed of the turbine must not exceed a critical value, since the mechanical load caused, for example, by centrifugal forces otherwise becomes too high. For this reason, as a rule, safety devices are provided, which bring about an immediate complete shutdown of the turbine if the critical rotational speed is exceeded. The shutdown is also called an emergency shutdown. Such an emergency shutdown should, as far as possible, be prevented by the regulating device of the turbine. In the event of load shedding, therefore, the rotational speed of the turbine must be quickly and reliably limited and returned to a standard value by the regulating circuit of the turbine. The invention, then, provides a method by which the operating reliability of a turbine during load shedding can be checked as regards the functioning capacity of the regulating circuit. For this purpose, irrespective of the operating state of the turbine, but preferably when the turbine is at a standstill, load shedding is simulated and fed to the regulating circuit. There is therefore no need to bring about actual load shedding, for example by uncoupling the generator. Such load shedding actually carried out would not be economically justifiable at all for reasons of cost, particularly in a power station. The reaction of the regulating circuit to the simulated load shedding is subsequently measured. The state of the regulating circuit is evaluated from the measurement data. In particular, it is possible to have evidence of whether repair or maintenance work on the regulating circuit is necessary.

Preferably, the input value characterizes the rotational speed, the power output or the pressure of a working fluid for driving the turbine. Further input values may also be fed to the regulating circuit, preferably, in each case, an input value for the pressure, the rotational speed, and the power is fed to the regulating circuit. To simulate load shedding, the regulating circuit is separated from the lines through which the actual values of these variables are otherwise delivered to the regulating circuit. Instead simulated values are entered in the regulating circuit. Preferably, all the input values for the regulating circuit are simulated.

The simulated time profile for the input value is preferably taken from a measurement database, in which measurement data for actual load shedding are stored. The simulation of the load shedding must conform as accurately as possible to the conditions of actual load shedding. This is achieved in a particularly simple and effective way by using measurement data of actual load shedding, preferably on exactly the same type of turbine, for the simulation.

Preferably, a new input value is calculated from the reaction of the regulating circuit to the simulated load shedding and is fed to the regulating circuit. The simulated load shedding is the initial situation, from which a specific reaction of the regulating circuit follows. An actuator which influences the rotational speed of the turbine is activated by the regulating circuit. For example, an actuating valve of a steam turbine is activated, so that more or less steam is provided for driving the steam turbine. It is also possible, for example, to activate an actuator for regulating the fuel quantity supplied to a gas turbine. The reaction of the regulating circuit is measured. From the measurement, then, preferably, the rotational speed of the turbine is established and, also preferably, the entire operating behavior of the turbine is calculated. New input values are calculated from the turbine operating behavior thus calculated and are fed to the regulating circuit. Such a cycle including the measurement of the reaction of the regulating circuit and the supply of new input values for the regulating circuit is preferably carried out until a state corresponding to a stable-speed state of the turbine has been established.

Preferably, the reaction of the regulating circuit to the simulated load shedding is stored as a first check or measured value in a monitoring database. A second check or measured value, which follows the first check, is compared with the first check with the aid of the monitoring database and changes in the regulating circuit since the first check was carried out is deduced from the comparison. A check is, therefore, full implementation of the method for checking the operating reliability of the turbine during load shedding. The possibility of checking the regulating circuit by simulated load shedding allows a cost-effective regular check to be conducted. Since the results of such checks are stored and compared with one another, even very small changes in the regulating circuit, caused, for example, by variations in the hydraulic system, can be detected. Variations in the actuating members activated by the regulating circuit are also recorded. Thus, preventive maintenance measures can be carried out on the regulating circuit and on the actuating members at an early stage and the system composed of the regulating circuit and of the actuating members can be kept fully functional at all times. The measures can take place within the framework of inspection work that has to be carried out in any case. If deficient functioning capacity of the regulating circuit during load shedding is detected, repair measures can be initiated immediately.

Preferably, the turbine is a steam or gas turbine, preferably with a power higher than 100 MW. A regulating circuit fully functional during load shedding and a method for documenting the functioning capacity are particularly useful for a steam turbine in a nuclear power station. As a rule, in a nuclear power station, an emergency shutdown of a steam turbine is a notifiable incident. The operational requirements and approval criteria are therefore particularly stringent here. Regular evidence of a functioning regulating circuit for the steam turbine of a nuclear power station is, accordingly, particularly valuable.

According to the invention, an apparatus is provided for checking the operating reliability of a turbine having a regulating circuit for regulating the rotational speed of the turbine during load shedding. An input value is fed to the regulating circuit from a simulation unit connected to the regulating circuit. With the simulation unit, load shedding can be simulated, irrespective of the operating state of the turbine. In this case, a simulated input value time profile corresponding to the load shedding is fed to the regulating circuit and the reaction of the regulating circuit to the load shedding thus simulated is subsequently measured.

The advantages of such an apparatus may be gathered accordingly from the above statements regarding the advantages of the method. Preferably, the turbine is constructed as a steam or gas turbine, also preferably with a power higher than 100 MW.

Preferably, a measurement data store is connected to the regulating circuit. The measurement data store storing measurement data of actual load shedding conditions.

Preferably, a monitoring data store is connected to the regulating circuit. The monitoring data store storing data relating to the reaction of the regulating circuit to simulated load shedding conditions.

Other features which are considered as characteristic for the invention are set forth in the appended claims.

Although the invention is illustrated and described herein as embodied in a method and apparatus for checking the operating reliability of a turbine during load shedding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic block diagram of an apparatus for checking a regulating circuit of a steam turbine according to the invention.

DESCRIPTION OF THE PREFERRED EMBODIMENTS

Referring now to the single FIGURE of the drawing in detail, there is shown a steam turbine 1 connected to a generator 5 via a gear 3. A subsidiary line A points from the gear 3 and a subsidiary line B from the generator 5 toward the top left edge of the figure in order to illustrate a further link to a regulating circuit 10. Steam 7 is fed as a working fluid, under a pressure D, to the steam turbine 1. The quantity of steam 7 supplied is regulated by an actuating valve 9. The actuating valve 9 is connected to an electrohydraulic converter 11. The electrohydraulic converter 11 is connected to a stroke regulator 13. The input of the stroke regulator 13 is connected to the output of the electrohydraulic converter 11 and to a minimum switch 19. The minimum switch 19 is connected to a pressure regulator 27. Furthermore, the minimum switch 19 is connected to a cascade point 21 that is connected, in turn, to a power regulator 23 and to a rotational speed regulator 25. The power regulator 23 is connected to a voltage/power converter 41. The rotational speed regulator 25 is connected to a voltage/rotational speed converter 43. The pressure regulator 27 is connected to a voltage/pressure converter 45. The voltage/power converter 41 is connected to the generator 5. The voltage/rotational speed converter 43 is connected to a sensor 47. The sensor 47 measures the rotational speed N of the turbine at the gear 3. The voltage/pressure converter 45 is connected to a pressure measuring device 46 for measuring the pressure D of the steam 7. The converters and regulators thus connected to one another form the regulating circuit 10.

A simulation unit 51 is connected via lines 52$a$, 52$b$ and 52$c$ to the regulating circuit 10. The simulation unit 51 has a measurement data store 53, an input unit 55 and a calculation unit 57. The measurement data store 53 is connected to the input unit 55. The calculation unit 57 is also connected to the input unit 55. Moreover, the calculation unit 57 is connected via a line 59 to a measurement unit 61 for measuring the mass flow of steam 7 entering the turbine 1. A line 63, which can be used for connecting further simulation units 51, branches off from the line 59. Furthermore, a monitoring data store 65 is connected to the regulating circuit 10 via lines 67*a*, 69*a*, 71*a*, 73*a* and 75*a*. The line 67*a* is connected to a measurement point 67 for measuring the output signal from the power regulator 23. The line 69*a* is connected to a measurement point 69 for measuring the output signal from the rotational speed regulator 25. The line 71*a* is connected to a measurement point 71 for measuring the output signal from the pressure regulator 27. The line 73*a* is connected to a measurement point 73 for measuring the output signal from the electrohydraulic converter 11. The line 75*a* is connected to a measurement point 75 for measuring the output signal from the stroke regulator 13. Further measurement points and lines may, if appropriate, also be provided. Under certain circumstances, even fewer measurement points are also sufficient.

When the turbine 1 is operating normally, it is set in rotation at the rotational speed N by the steam 7. The rotational speed N is measured at the gear 3 via the sensor 47 and is converted into a voltage UN in the voltage/rotational speed converter 43. The turbine 1 provides the power L required by the generator 5. The power L is converted into a voltage UL in the voltage/power converter 41. The pressure D of the steam 7 is measured by the pressure measurement unit 46 and is converted into a voltage UD by the voltage/pressure converter 45. The voltage UL has superposed on it, via the line 31, a desired value for the power L that is supplied via the line 29. The superposed signal is fed to the power regulator 23. The voltage UN has superposed on it, via the line 35, a desired value for the rotational speed N, supplied via the line 33, and is fed to the rotational speed regulator 25. The voltage UD has superposed on it, via a line 39, a desired value for the pressure D, supplied via line 37, and is fed to the pressure regulator 27. The output signal from the pressure regulator 27 is fed to the minimum unit 19. The output signals from the power regulator 23 and from the rotational speed regulator 25 are added at the cascade point 21 and are likewise fed to the minimum unit 19. In the minimum unit 19, the smaller of the two signals is output via the line 17. This signal corresponds to a desired value for a stroke of the actuating valve 9. The actual value for the stroke has the desired value superposed on it via the line 15, and the signal thus superposed is fed to the stroke regulator 13. The output signal from the stroke regulator 13 is converted into a pressure via the electrohydraulic converter 11, in such a way that the desired stroke of the actuating valve 9 is set. The quantity of steam 7 supplied to the turbine 1 is set via the stroke of the actuating valve 9. The rotational speed N and the power output L of the turbine 1 can be set via this quantity of steam 7.

If the generator 5 suddenly requires less power L, a braking action on the turbine 1 decreases. The rotational speed N consequently increases. The object of the regulating circuit 10, in such a case, is to quickly return the rotational speed N to a standard value. In particular, it is necessary to prevent the rotational speed N from exceeding a critical value at which an emergency shutdown of the turbine 1 will be triggered.

In order to check whether the regulating circuit 10 meets these requirements, such load shedding is simulated. This takes place, preferably, when the turbine 1 is at a standstill. For this purpose, the voltage/power converter 41, voltage/rotational speed converter 43 and voltage/pressure converter 45 are uncoupled and, instead, simulated signals for the power L, rotational speed N and pressure D are fed into the regulating circuit 10 via the lines 52*a*, 52*b* and 52*c*. The simulated signals are taken from the measurement data store 53. The latter stores measurement data relating to an actual load shedding test previously carried out. The measurement data are supplied to the input unit 55 as a time profile 54 for the input values of the power L, rotational speed N and pressure D and are fed into the regulating circuit 10 by the input unit 55. With the aid of the measurement points 67, 69, 71, 73 and 75, then, the behavior of the regulating circuit 10 in response to the simulated load shedding is measured. The measurement data are supplied to the monitoring data store 65 via the lines 67*a*, 69*a*, 71*a*, 73*a* and 75*a*. A specific stroke for the actuating valve 9 follows from the reaction of the regulating circuit 10. A new operating state for the turbine 1 is calculated from the stroke in the calculation unit 57 via the measurement point 61. The new operating state leads to new input values for the power L, rotational speed N and pressure D. The new input values are delivered to the input unit 55 and, in turn, are fed into the regulating circuit 10 by the latter. The cycle including the feeding of input values into the regulating circuit 10 and the calculation of a new operating state of the turbine 1 preferably takes place until a state corresponding to a stable speed state of the turbine 1 has been established.

By such a method, not only can the functioning capacity of the regulating circuit 10 during load shedding be checked reliably, but subtle changes in the regulating circuit 10, as compared with earlier conditions, can also be determined. For this purpose, a measurement obtained from the method is compared with earlier measurements in the monitoring data store 65. As a result, in particular, measures for maintaining or repairing the regulating circuit 10 can be taken at an early stage and at an appropriate time. It is also possible to check the functioning capacity of the actuating valve 9 with the method.

I claim:

1. A method for checking operating reliability of a turbine during load shedding, which comprises:

feeding an input value having a time profile simulating a turbine load shedding condition to a regulating circuit regulating a rotational speed of a turbine for simulating the turbine load shedding condition in the regulating circuit; and measuring a reaction of the regulating circuit to the input value simulating the turbine load shedding condition.

2. The method according to claim 1, which comprises formulating the input value to characterize a rotational speed of the turbine.

3. The method according to claim 1, which comprises formulating the input value to characterize a power output of the turbine.

4. The method according to claim 1, which comprises formulating the input value to characterize a pressure of a working fluid driving the turbine.

5. The method according to claim 1, which comprises formulating the time profile of the input value from a measurement database containing actual load shedding data.

6. The method according to claim 1, which comprises calculating a new input value from the reaction of the regulating circuit to the input value simulating the turbine load shedding condition and feeding the new input value to the regulating circuit.

7. The method according to claim 1, which comprises:

storing a reaction of the regulating circuit to the input value as a first measured value in a monitoring database;

after the first measured value is saved storing a second measured value of the reaction of the regulating circuit in the monitoring database;

comparing the first measured value with the second measured value with the aid of the monitoring database; and deducing changes in the regulating circuit occurring after the first measured value was determined from the comparing step.

8. The method according to claim 1, wherein the turbine is a steam turbine.

9. The method according to claim 1, wherein the turbine is a steam turbine with a power rating of at least 100 MW.

10. The method according to claim 1, wherein the turbine is a gas turbine.

11. The method according to claim 1, wherein the turbine is a gas turbine with a power rating of at least 100 MW.

12. The method according to claim 1, which comprises carrying out the feeding and measuring steps with the turbine at a standstill.

13. In combination with a turbine having a regulating circuit regulating a rotational speed of the turbine, an apparatus for checking operating reliability of the turbine during load shedding, comprising:

a simulation unit supplying a simulated input value having a time profile corresponding to a load shedding condition to the regulating circuit for simulating a load shedding condition irrespective of an operating state of the turbine, and a reaction of the regulating circuit to said input value being measured.

14. The apparatus according to claim 13, wherein the turbine is a steam turbine.

15. The apparatus according to claim 13, wherein the turbine is a steam turbine with a power rating of at least 100 MW.

16. The apparatus according to claim 13, wherein the turbine is a gas turbine.

17. The apparatus according to claim 13, wherein the turbine is a gas turbine with a power rating of at least 100 MW.

18. The apparatus according to claim 13, including a measurement data store connected to the regulating circuit, said measurement data store storing measurement data relating to actual load shedding conditions.

19. The apparatus according to claim 13, including a monitoring data store connected to the regulating circuit, said monitoring data store storing data relating to the reaction of the regulating circuit to said input value simulating the load shedding condition.

* * * * *